INVENTOR.
HUBERT T. SPARROW
BY
ATTORNEY

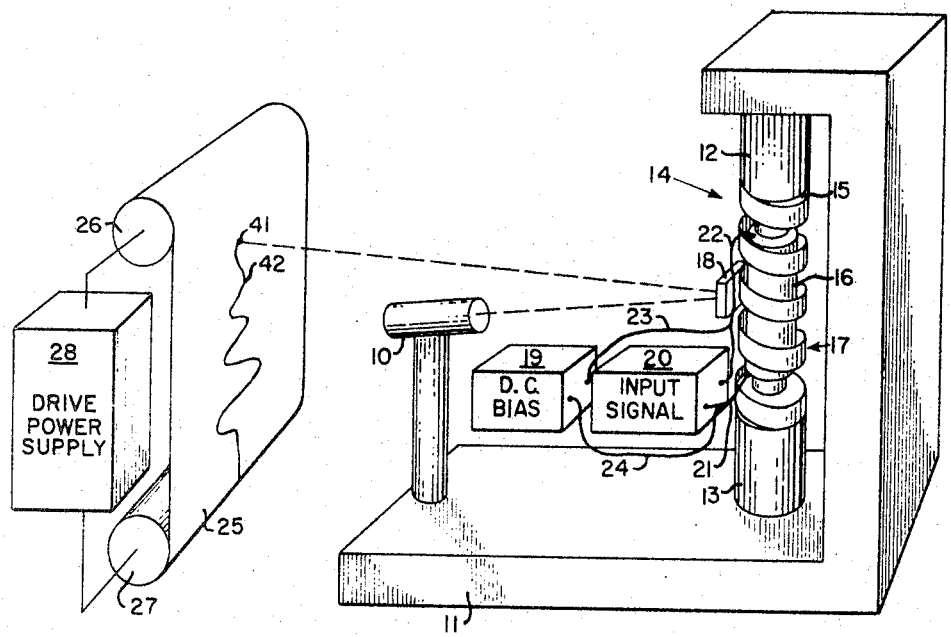
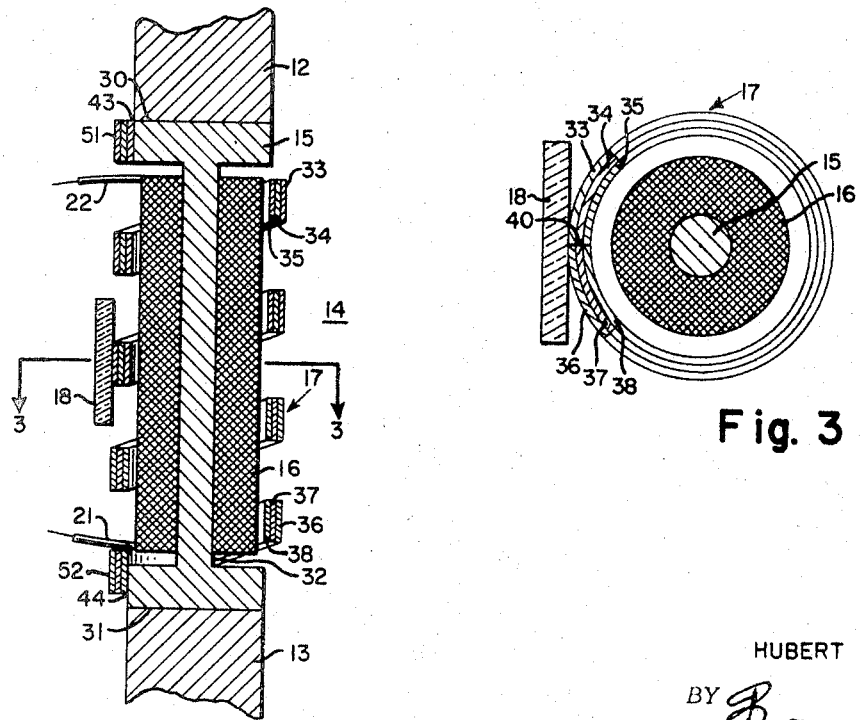

United States Patent Office 3,488,587
Patented Jan. 6, 1970

3,488,587
MAGNETOSTRICTIVE ELECTROMECHANICAL GALVANOMETER APPARATUS
Hubert T. Sparrow, Edina, Minn., assignor to Honeywell Inc., Minneapolis, Minn., a corporation of Delaware
Filed Apr. 4, 1966, Ser. No. 539,931
Int. Cl. G01r 13/38, 33/02, 13/04
U.S. Cl. 324—97                   3 Claims

ABSTRACT OF THE DISCLOSURE

A magnetostrictive galvanometer apparatus and system that uses a transducer element having multiple layers of magnetostrictive material in a low reluctance magnetic circuit. The low reluctance magnetic circuit is accomplished by connecting a flux generating means across the end portions of the transducer to form at least one closed magnetic flux path through the transducer. An output means is symmetrically positioned with respect to the transducer means to provide a balanced mechanical structure.

---

This invention relates to magnetostrictive electromechanical transducers, and, more particularly, to transducers utilizing multilayered magnetostrictive materials to achieve a rotary motion output from an electrical current input.

It is well known that magnetostrictive materials exhibit one of two types of magnetostrictive action. Positive magnetostrictive material increases in length with an increase in magnetic flux density in the material and has a positive coefficient of magnetostriction. Negative magnetostrictive material decreases in length with an increase in flux density and has a negative coefficient of magnetostriction. As used in this specification, the term "differing coefficients of magnetostriction" encompasses pairs of materials having two different positive coefficients of magnetostriction, or having two different negative coefficients of magnetostriction; pairs of materials having a positive coefficient and no magnetostrictive coefficient or a negative coefficient and no magnetostrictive coefficient; or pairs of materials having a positive coefficient and a negative coefficient. Magnetostrictive action is a function of the current in an electromagnetic coil positioned to create a magnetic flux path through the pairs of materials.

It is also well known that positive and negative magnetostrictive materials may be bonded together to form a multilayered member which flexes when subjected to a magnetic field. It has been proposed that such a member may be coiled in the form of a spiral with one end fixed and the free end supporting light reflector means. The difficulty with such prior art devices has been that no closed flux path is formed, and, consequently, very high magnetic fields are required to produce significant motion.

The present invention overcomes this prior art difficulty. The present invention provides a transducer in which the multilayer material has its opposite ends positioned in substantially fixed angular relation, independent of the magnitude of the magnetic flux in the transducer, and has a portion intermediate the ends rotatable relative to the ends in response to magnetic flux in the transducer. The ends of the multilayer material may be rigidly secured to opposite ends of a magnetic flux generator by any low magnetic reluctance material to form a closed flux path through the flux generator and the transducer. An output means cooperates with the rotatable portion to give an output indicative of the rotary motion produced when an electric current is applied to the flux generator.

Figure 4:
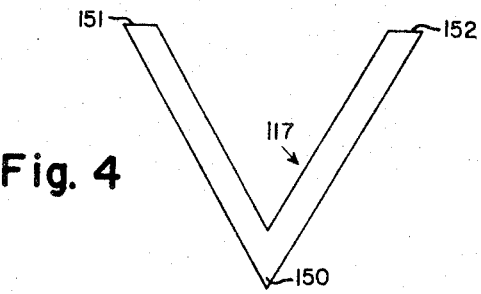
Figure 5:
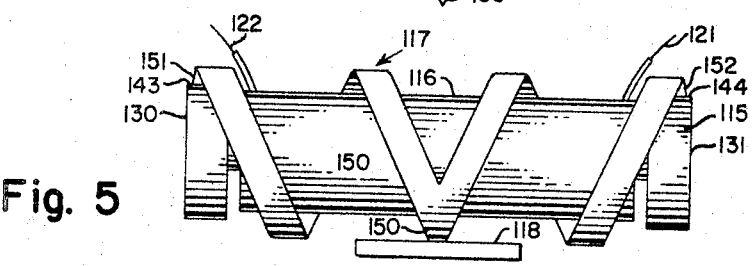
Figure 6:
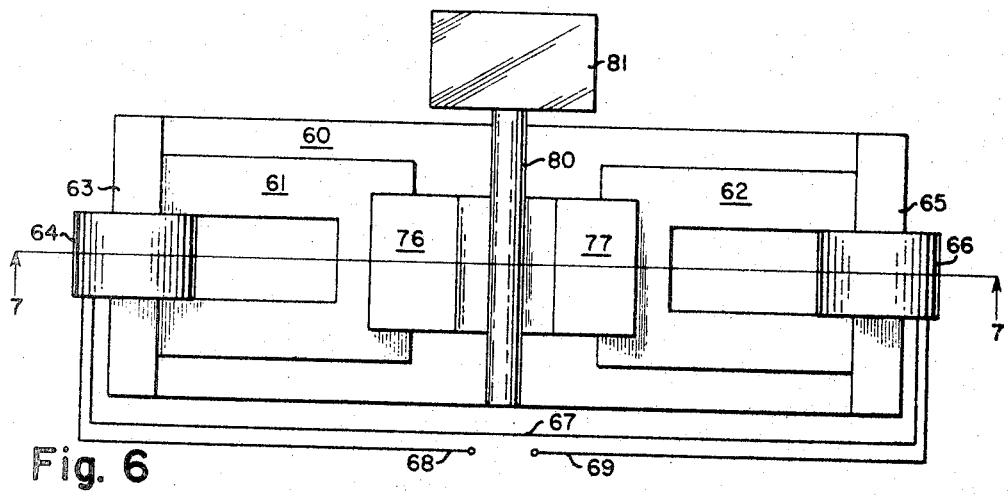
Figure 7:
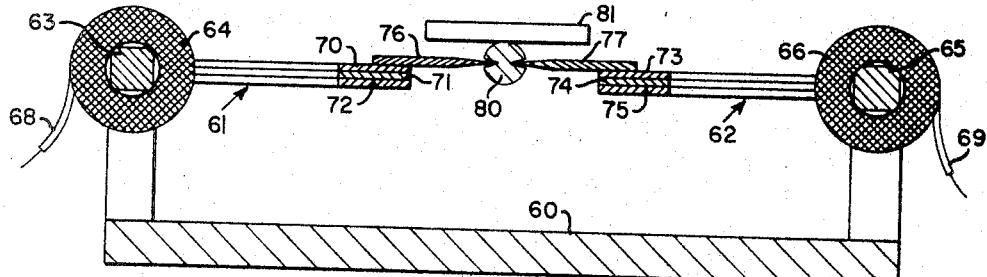

FIGURE 1 is a diagrammatic perspective view of an optical recording galvanometer system using the present invention; FIGURE 2 is a diagrammatic cross-section of a magnetostrictive apparatus utilizing the invention; FIGURE 3 is a diagrammatic cross-sectional view of the apparatus of FIGURE 2 taken along line 3—3; FIGURE 4 is a modified form of a magnetostrictive apparatus; FIGURE 5 is a diagrammatic showing of a transducer utilizing the structure of FIGURE 4; FIGURE 6 is a diagrammatic top view of a further modified form of an apparatus utilizing the invention; and FIGURE 7 is a diagrammatic cross-sectional view of the structure of FIGURE 6 along line 7—7.

FIGURES 1 through 3 disclose an apparatus utilizing a first form of the invention. A light source 10 is rigidly mounted on a base 11 which also carries a pair of nonmagnetic supporting members 12 and 13. A closed flux path magnetostrictive apparatus, generally designated 14, is supported by members 12 and 13. Apparatus 13 comprises a ferromagnetic core member 15, an electrically conductive coil 16, a multilayered magnetostrictive member, and low magnetic reluctance means, such as tin-lead solder or a welded portion of the magnetostrictive member, connecting transducer 17 across core member 15. Output means, such as mirror 18, cooperates with transducer 17 to indicate rotation of a portion of transducer 17. Core member 15 and coil 16 form a magnetic flux generating means or electromagnet which is connected to an input signal means 20. DC bias means 19 may also be connected to the electromagnet.

The purpose of bias means 19 is to set the transducer 17 at an initial deflection which is about half the magnitude of the maximum deflection obtained at magnetic saturation of the magnetostrictive member. Magnetostrictive multilayered material deflects in a direction determined by the relative positions of the positive and negative magnetostrictve layers. The direction of deflection in magnetically unbiased material is independent of the polarity of the applied signal. Therefore, in order to obtain motion which occurs at the same frequency as an applied AC input signal, the DC bias to the magnetizing coil or a biasing magnetic flux from another coil or from a permanent magnet is essential.

The recording portion of the system of FIGURE 1 is shown as a light sensitive recording medium 25 supported between drive cylinders 26 and 27. A drive power supply 28 causes rotation of cylinders 26 and 27 and drives medium 25 vertically from cylinder 26 to cylinder 27.

The detailed structure of the closed flux path magnetostrictive apparatus 14 is shown in FIGURES 2 and 3. Core member 15 is generally spool shaped and has cylindrical end portions 30 and 31 connected by a shank portion 32. Magnetizing coil 16 is wound on shank portion 32 and terminates in conductors 21 and 22 at its opposite ends. Transducer 17 is a magnetostrictive trimetal helix having first and second helical portions which are connected to form a continuous helix. The first portion includes an outside negative magnetostrictive layer 33, a positive magnetostrictive layer 34, and a suitable nonmagnetic ambient temperature compensating material layer 35 on the inside. The second portion has the ambient temperature compensating layer 36 on the outside, a positive magnetostrictive layer 37 in the middle, and a negative magnetostrictive layer 38 on the inside. The two portions are connected by a butt-welded region 40 to form a continuous helix wherein the first portion has positive magnetostrictive layer 35 disposed closer to the axis of the helix than negative layer 34, and the second portion has negative magnetostrictive layer 38 disposed closer to the axis than positive layer 37. Mirror 18 is attached to the helix at the region of connection 40. The first and second helix portions are constructed of equal lengths of multilayered magnetostrictive material. The ends 51 and 52 of helix 17 are rigidly attached to end portions 30 and 31 of core member 15 by low reluctance means such as soldered or welded regions 43 and 44. A closed path for magnetic flux is thereby formed from end 30 of core member 15 through region 43 and helix 17 to region 44 and end 31 of core member 15, then through the length of core member 15 to the opposite end 30.

The operation of the closed flux path magnetostrictive apparatus of FIGURES 2 and 3 is as follows. A current applied to coil 16 by signal means 20 causes a change in magnetic flux in core member 15 and helix 17. Increasing the flux density in helix 17 causes the first portion having layer 33 on the outside to unwind and causes the second portion having layer 36 on the outside, to wind more tightly. Since the first and second portions are equal in length, the unwinding of the first portion is exactly counteracted by the winding of the second portion at the rigidly mounted ends 51 and 52. No strain is caused at these ends, and they remain in a fixed angular relation to one another independent of the flux in the helix 17. However, the point where the first and second portions are connected by region 40 rotates with respect to ends 51 and 52. As viewed in FIGURE 3, the rotation is in a clockwise direction with increasing flux. When an alternating current input signal is superimposed upon a DC or magnetic flux bias, mirror 18 rotates alternately counterclockwise and clockwise about an equilibrium position.

Referring now to FIGURE 1, the operation of the entire recording galvanometer system can be understood. Light from source 10 is directed at mirror 18 and reflected therefrom to impinge on recording medium 25. In the absence of an input signal, mirror 18 remains motionless. Drive power supply 28 supplies power to move medium 25 in the vertical direction from cylinder 26 to cylinder 27. As medium 25 is driven past a spot of impingement 41, a vertical line 42 is generated on photosensitive medium 25.

When no DC bias is applied and an alternating current input signal is supplied to coil 16, mirror 18 rotates at double the frequency of the applied input signal. Rotation always proceeds in the same direction from the null position with increasing flux magnitude regardless of its polarity. When a DC bias is added, the mirror 18 assumes a new equilibrium position and rotates to either side of that position depending upon the polarity of the magnetic field. Rotary motion is thus obtained in a direction determined by the polarity of the magnetic field and in an amount determined by the magnitude of the field. The rotary motion of mirror 18 combined with the linear motion of medium 25 yields a line 42 on medium 25 which is representative of both the magnitude and polarity of the applied input signal.

FIGURES 4 and 5 disclose a modified magnetostrictive apparatus which may be substituted in the system of FIGURE 1 for that shown therein. Corresponding parts are shown in FIGURES 4 and 5 by corresponding numbers increased by 100. An ambient temperature compensated magnetostrictive multilayered transducer 117 has a substantially V-shaped form before being coiled. After coiling, helical member 117 comprises two reverse wound helical portions connected at the point 150 of the V. The mirror 118 is secured to point 150. The ends 151 and 152 of the legs of the V are rigidly attached to ends 130 and 131 respectively of core member 115 by regions 143 and 144. The magnetostrictive apparatus thus formed operates in exactly the same manner as that of FIGURES 1 through 3. That is, ends 151 and 152 maintain a fixed angular relation to one another and point 150 rotates with respect to them upon a change in the flux density in member 117. The advantage of the modification of FIGURES 4 and 5 is that magnetostrictive member 117 may be formed from a single multilayered piece of magnetostrictive material thereby eliminating the need for butt-welding. The first and second helical portions, in this modification, are connected by that portion of the magnetostrictive material itself which forms the point 150 of V.

A further embodiment of the invention is shown in FIGURES 6 and 7. A nonmagnetic support 60 supports a pair of U-shaped magnetostrictive trimetallic members 61 and 62 as cantilever beams with their free ends substantially aligned opposite each other. A first ferromagnetic core member 63 has its ends connected across the legs of magnetostrictive beam 61. A first coil 64 is wound around core member 63. A second ferromagnetic core member 65 has its ends disposed across the legs of magnetostrictive beams 62. A second coil 66 is wound around core member 65. Coils 64 and 66 are connected in series and are adapted to be connected across the terminals of an input signal means through conductors 68 and 69. Beam 61 includes a negative magnetostrictive layer 70, a positive compensating layer 72. Beam 62 includes an ambient temperature compensating layer 73, a positive magnetostrictive layer 74, and a negative magnetostrictive layer 75. A pair of knife edges 76 and 77 are connected to beams 61 and 62 respectively and support a rotatable member 80 which carries an indicating means 81.

In operation, application of an input signal to conductors 68 and 69 causes deflection of beams 61 and 62 in opposite directions thereby causing rotation of member 80 and indicating means 81. For example, an increasing flux density causes member 61 to deflect upward, as seen in FIGURE 7, and causes member 62 to deflect downward. Such combined deflections cause rotatable member 80 to rotate in a clockwise direction. It is readily apparent that if oscillations to either side of a null point are desired, a DC bias should be applied between conductors 68 and 69. The apparatus shown in FIGURES 6 and 7 has the same advantage as the modifications described above; namely, that a closed flux path is provided in the magnetostrictive material component of an apparatus yielding a rotary motion output.

The device shown in FIGURES 6 and 7 does not require a compensated trimetal when a magnetostrictive bimetal is installed so that a temperature change causes the free ends of both U-shaped members to deflect in the same direction and the coils are connected in reverse phase so that the signal current adds to the bias flux of one U-shaped bimetal but subtracts from the bias flux of the other U-shaped bimetal. The biasing means is essential.

I claim:
1. A closed path magnetostrictive apparatus comprising:
   transducer means including multilayered magnetostrictive means having first and second helical portions, each portion having a positive magnetostrictive layer, a negative magnetostrictive layer, and an ambient temperature compensating layer, the first portion having the positive layer disposed closer to its axis than the negative layer, and the second portion having the negative layer disposed closer to its axis than the positive layer with the transducer means further having ends positioned in substantially fixed angular relation and having a rotatable portion intermediate the ends responsive to magnetic flux in the magnetostrictive means;
   connecting means connecting the first and second portions to form a continuous helix;
   output means cooperating with and symmetrically positioned with respect to the rotatable portion;
   magnetic flux generating means including a generally spool-shaped low magnetic reluctance solid ferromagnetic core member having opposite end portions connected by a shank portion and disposed substantially within the helix to form at least one closed flux path whereby magnetic flux causes symmetrical operation of the rotatable portion; and an electrically conductive coil wound on the shank portion for connection to a source of signal current.

2. An optical recording galvanometer comprising:
an apparatus according to claim 1 wherein the output means includes light reflective means mounted on the connecting means;
light source means;
mounting means, including at least a nonmagnetic portion connected to the ends of the spool, mounting the apparatus so that the light reflecting means intercepts the light path from the light source means; and
light sensitive recording means disposed in the path of light reflected from the light reflective means.

3. A closed flux path magnetostrictive apparatus comprising:
multilayered magnetostrictive transducer means including first and second U-shaped ambient temperature compensated cantilever magnetostrictive members having the free ends thereof substantially aligned opposite one another, the members each having at least first and second layers with different coefficients of magnetostriction, the second members having the layers disposed therein in the order opposite that of the first member so that the free ends deflect in opposite directions when magnetic flux is applied to the members;
rotatable connecting means connecting the free ends of the members and rotatable upon deflection thereof;
output means mounted on the rotatable connecting means and cooperating with and symmetrically positioned with respect to a rotatable portion;
magnetic flux generating means including first and second ferromagnetic core members;
first and second electrically conducting coils wherein the coils are wound on the first and second core members respectively, for connection to a source of electric signal current; and
low magnetic reluctance means connecting the magnetic flux generating means across the legs of the first and second magnetostrictive members respectively to form closed flux paths therein whereby magnetic flux causes symmetrical operation of the rotatable portion.

References Cited

UNITED STATES PATENTS

| | | | |
|---|---|---|---|
| 1,821,836 | 9/1931 | Hull | 318—118 X |
| 2,010,016 | 8/1935 | French | 324—97 |
| 2,076,678 | 4/1937 | Smulski | 324—106 |
| 2,137,188 | 11/1938 | Whitman | 324—113 X |
| 2,284,082 | 5/1942 | Bloch. | |
| 2,475,148 | 7/1949 | Massa | 335—215 X |
| 2,476,778 | 7/1949 | Smoluchowski | 310—26 |
| 2,920,529 | 1/1960 | Blythe | 324—97 X |
| 3,209,181 | 9/1965 | Brockman et al. | 335—215 X |

WILLIAM F. LINDQUIST, Primary Examiner

JERALD J. DEVITT, Assistant Examiner

U.S. Cl. X.R.

310—26; 324—47, 113; 335—215